United States Patent [19]

Bunthoff et al.

[11] Patent Number: 4,660,768

[45] Date of Patent: Apr. 28, 1987

[54] NOZZLE FOR INJECTING SOLIDS PNEUMATICALLY

[75] Inventors: Dirk Bunthoff; Rainer Hildebrandt, both of Essen, Fed. Rep. of Germany

[73] Assignee: Deutsche Babcock Werke Aktiengesellschaft, Oberhausen, Fed. Rep. of Germany

[21] Appl. No.: 852,353

[22] Filed: Apr. 15, 1986

[30] Foreign Application Priority Data

Apr. 17, 1985 [DE] Fed. Rep. of Germany ....... 3513764

[51] Int. Cl.⁴ ............................ F23D 1/00; B05B 1/26
[52] U.S. Cl. .................................... 239/423; 34/57 B; 110/265; 239/426; 239/499; 239/500
[58] Field of Search .................... 239/424, 425, 424.5, 239/430, 423, 421, 431, 416.4, 416.5, 654, 655, 105, 325; 110/347, 245, 263, 265; 431/170, 172, 187; 34/57 A, 57 B; 122/4 D

[56] References Cited

U.S. PATENT DOCUMENTS

| | | | |
|---|---|---|---|
| 2,175,310 | 10/1939 | Pontius | 239/424.5 X |
| 2,185,369 | 1/1940 | Bowen | 239/426 X |
| 3,929,290 | 12/1975 | Tallarovio | 239/423 X |
| 3,949,908 | 4/1976 | Baille | 239/655 X |
| 4,309,948 | 1/1982 | Zieliwski | 110/263 |
| 4,526,111 | 7/1985 | Mischke | 110/245 |
| 4,574,496 | 3/1986 | Sedlacek | 110/263 X |

*Primary Examiner*—Andres Kashnikow
*Assistant Examiner*—Kevin P. Weldon
*Attorney, Agent, or Firm*—Max Fogiel

[57] ABSTRACT

A nozzle that consists of a pipe (4) with the end that extends into the treatment space surrounded by a hood (6) is employed to inject solids into a reaction space, a fluidized-bed combustion chamber for example, pneumatically. There are outlet bores (12) in the wall of the pipe (4) and below the lower edge of the hood (6). Inside the pipe (4) is an inner pipe (13) that is connected tight to pipe (14) above the outlet bores (12) and that creates in conjunction with the pipe (4) a space (14) for air to flow through. The air flowing through this intermediate space (14) and emerging from the outlet bores (12) ensures transverse intermixture of the solids inside the reaction space.

3 Claims, 1 Drawing Figure

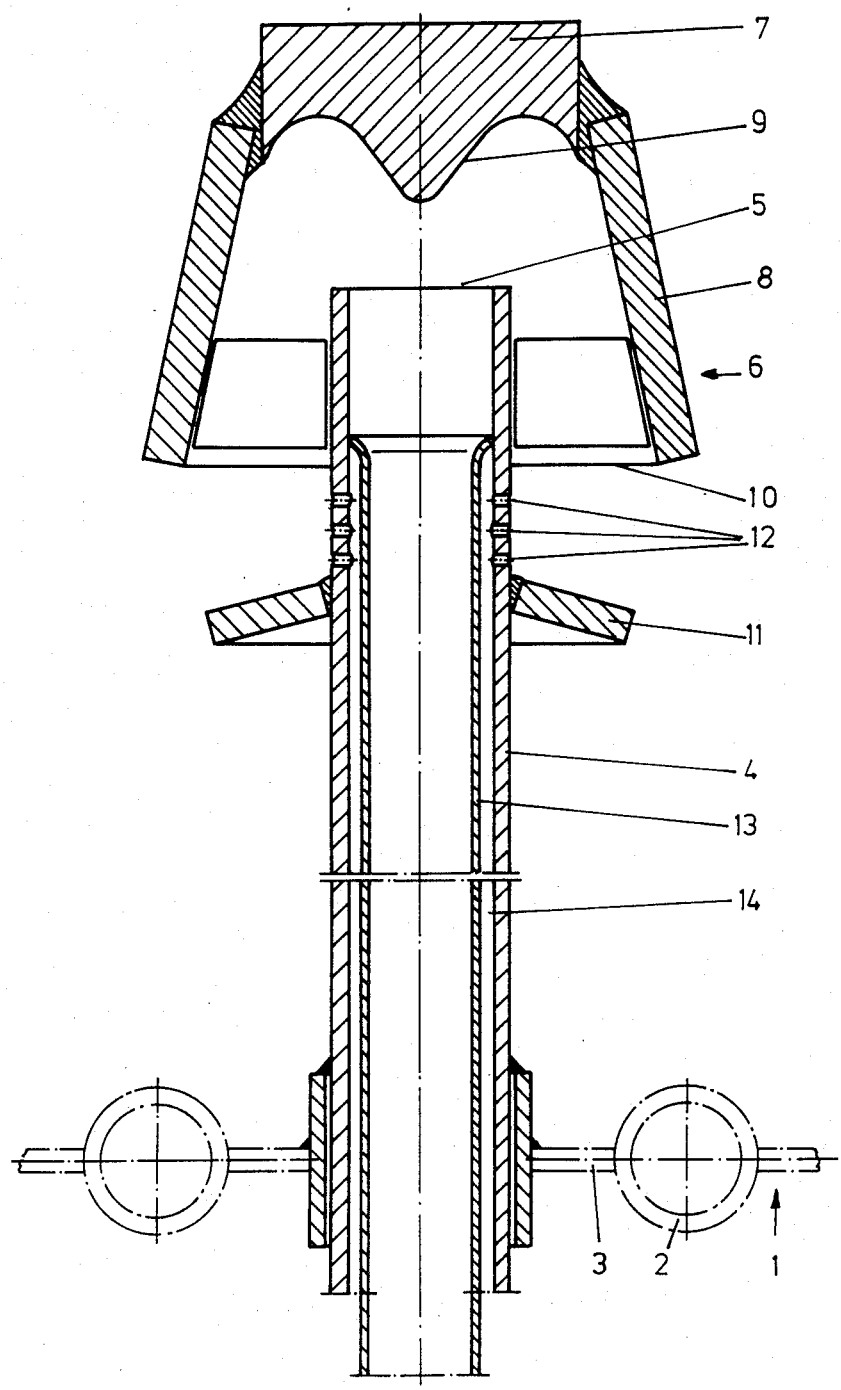

NOZZLE FOR INJECTING SOLIDS PNEUMATICALLY

The invention concerns a nozzle for injecting solids pneumatically into a reaction space, especially into a fluidized-bed combustion chamber, with the characteristics of the preamble to claim 1.

A nozzle of this type is known from German OS No. 3 019 701. The advantages of this nozzle are that it does not clog up when the supply of air and solids is discontinued and that wear can be kept low. The transverse intermixture of the injected solids is, however, slight, even when there is a diversion plate below the hood. Although the transverse intermixture of the injected solids is improved in nozzles that have lateral outlets, the advantage is accompanied by increased wear on the nozzles.

The object of the invention is to create a nozzle of the generic type with improved transverse intermixture of the injected solids.

This object is attained in a nozzle of the generic type by means of the characteristics in claim 1. claim 2 recites a practical embodiment of the invention.

The air emerging from the exit bores below the hood horizontally accelerates the mixture of air and solids supplied through the pipe. This horizontal acceleration leads to essential improvement in the transverse intermixture of the solids inside the reaction space. The other advantages, elimination of clogging and of wear, associated with nozzles of the generic type are, however, retained.

One embodiment of the invention is illustrated in the drawing and will now be specified. The drawing is a longitudinal section through a nozzle in accordance with the invention.

The nozzle for injecting a mixture solids and air pneumatically extends into a reaction space that is embodied in the present case by a fluidized-bed combustion chamber. The fluidized bed rests on a floor 1 that consists of pipes 2 connected together gas-tight by webs 3. Below floor 1 is an air box that communicates with a source of air and, through unillustrated air nozzles that extend through the floor, with the fluidized-bed combustion chamber.

The nozzle consists of a pipe 4 with an axial outlet 5. A hood 6 that is attached to pipe 4 consists of base 7 and of a conical wall 8. The base 7 of the hood has a vertical deflection surface 9 that faces outlet 5 at an axial distance. Between the wall 8 of hood 6 and the wall of pipe 4 is an axial outlet cross-section 10.

A diversion plate 11 is secured to pipe 4 below the axial outlet cross-section 10 between hood 6 and pipe 4. Diversion plate 11 can slope down.

Below the outlet cross-section 10 of hood 6 and above diversion plate 11 if one is present are outlet bores 12 in the wall of pipe 4. An inner pipe 13 is positioned concentric with and inside pipe 4 in such a way as to leave a space 14 between the two pipes. Inner pipe 13 is connected tight to the inside of pipe 4 downstream of outlet bores 12.

Inner pipe 13 extends through the air box below floor 1 and communicates with an unillustrated supply line. Intermediate space 14 can communicate with the air box as illustrated to allow air to flow out of the air box, through the intermediate space, and out of outlet bores 12 due to the difference in pressure between the air box and the combustion chamber. Air that is subject to pressure that is higher than that in the air box can, however, also be employed. In that case there must be a separate source of air at an appropriate pressure.

The solids (coal or bed ash) that are supplied by conveyor air through inner pipe 13 emerge through the outlet 5 from pipe 4, are gently deflected at deflection surface 9, and arrive in the fluidized bed through outlet cross-section 10. As it emerges from outlet cross-section 10, the mixture of solids and air is accelerated horizontally by the air emerging from outlet bores 12 and accordingly distributed over a more extensive cross-section of the fluidized bed.

Although the invention has been specified with reference to the pneumatic injection of coal or bed ash into a fluidized-bed combustion chamber, it can also be employed to pneumatically convey solids into another type of reaction space.

What is claimed is:

1. A nozzle for injecting solids pneumatically into a reaction space of a fluidized-bed combustion chamber, comprising: an outer pipe for conveying a mixture of solids and air and having an open end in said combustion chamber; a hood surrounding said open end at a spaced distance therefrom and having an outlet area; said hood having a deflection surface facing said outlet area; said pipe having exit bores in the wall thereof and spaced from said outlet area of said hood; an inner pipe positioned concentrically within said outer pipe and leaving an annular space between said inner pipe and said outer pipe for passage of air through said annular space, said inner pipe being connected seal-tight to said outer pipe at a distance downstream from said exit bores.

2. A nozzle as defined in claim 1 wherein the mixture of solids and air enters said reaction space with a predetermined pressure loss, air flowing through said annular space having a pressure exceeding said pressure loss.

3. A nozzle for injecting solids pneumatically into a reaction space of a fluidized-bed combustion chamber, comprising: an outer pipe for conveying a mixture of solids and air and having an open end in said combustion chamber; a hood surrounding said open end at a spaced distance therefrom and having an outlet area; said hood having a deflection surface facing said outlet area; said pipe having exit bores in the wall thereof and spaced from said outlet area of said hood; an inner pipe positioned concentrically within said outer pipe and leaving an annular space between said inner pipe and said outer pipe for passage of air through said annular space, said inner pipe being connected seal-tight to said outer pipe at a distance downstream from said exit bores; said mixture of solids and air entering said reaction space with a predetermined pressure loss, air flowing through said annular space having a pressure exceeding said pressure loss; said hood having a base portion and a conical wall; a diversion plate on said outer pipe and below said outlet area of said hood, said diversion plate sloping downward, said exit bores being located above said diversion plate and below said outlet area of said hood; said mixture of solids and air flowing through said inner pipe exiting through said open end from said outer pipe and being deflected at said deflection surface of said hood and reaching the fluidized bed through said outlet area of said hood, the mixture of solids and air exiting from said outlet area being accelerated horizontally by air flowing from said exit bores to become distributed over a substantial cross section of said fluidized bed.

* * * * *